United States Patent
Persson et al.

(10) Patent No.: US 9,479,976 B2
(45) Date of Patent: *Oct. 25, 2016

(54) HANDOVER IN A RADIO COMMUNICATION NETWORK

(71) Applicant: Telefonaktiebolaget LM Ericsson (publ), Stockholm (SE)

(72) Inventors: Fredrik Persson, Märsta (SE); Håkan Olofsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,464

(22) Filed: Jan. 26, 2016

(65) Prior Publication Data

US 2016/0142947 A1    May 19, 2016

Related U.S. Application Data

(63) Continuation of application No. 13/318,560, filed as application No. PCT/SE2009/050480 on May 4, 2009, now Pat. No. 9,264,950.

(51) Int. Cl.
| | |
|---|---|
| H04W 36/00 | (2009.01) |
| H04W 36/08 | (2009.01) |
| H04W 28/24 | (2009.01) |
| H04W 80/02 | (2009.01) |
| H04W 56/00 | (2009.01) |
| H04W 92/20 | (2009.01) |

(52) U.S. Cl.
CPC ......... *H04W 36/0072* (2013.01); *H04W 28/24* (2013.01); *H04W 36/0044* (2013.01); *H04W 36/0055* (2013.01); *H04W 36/08* (2013.01); *H04W 80/02* (2013.01); *H04W 36/00* (2013.01); *H04W 56/001* (2013.01); *H04W 92/20* (2013.01)

(58) Field of Classification Search
CPC ........... H04W 36/0055; H04W 92/20; H04W 36/0072
USPC .................................................. 370/328–332
See application file for complete search history.

(56) References Cited

U.S. PATENT DOCUMENTS

| | | | |
|---|---|---|---|
| 2004/0248575 A1* | 12/2004 | Rajala ............... | H04W 36/0033 455/436 |
| 2006/0003733 A1* | 1/2006 | Chun .................... | H04L 67/322 455/403 |
| 2007/0293224 A1* | 12/2007 | Wang ................ | H04W 36/0055 455/436 |
| 2008/0026757 A1* | 1/2008 | Olvera-Hernandez | H04W 36/005 455/436 |
| 2008/0167054 A1* | 7/2008 | Shaheen ............... | H04W 60/04 455/458 |
| 2009/0201884 A1* | 8/2009 | Chaponniere ......... | H04W 92/20 370/332 |
| 2011/0009119 A1* | 1/2011 | Breuer .............. | H04W 36/0055 455/436 |

OTHER PUBLICATIONS

Huawei. "CR to 36.300 on AS-Configuration During Handover." 3GPP TSG-RAN WG2 Meeting #65, R2-091180, 3rd Generation Partnership Project, Athens, Greece, Feb. 9-13, 2009, pp. 1-4.

(Continued)

*Primary Examiner* — Jae Y Lee
*Assistant Examiner* — Jean F Voltaire
(74) *Attorney, Agent, or Firm* — Coats & Bennett, PLLC

(57) ABSTRACT

The present invention relates to providing a method and a network node that prevents radio bearers from being dropped if a mismatch in RLC Mode exists between source Node and target Node.

6 Claims, 3 Drawing Sheets

(56) References Cited

OTHER PUBLICATIONS

Ericsson. "Handling of Unrecognized QCIs." 3GPP TSG SA WG2 Meeting #71, Agenda Item: 6.2, TD S2-090959, 3rd Generation Partnership Project, Budapest, Hungary, Feb. 16-20, 2009, pp. 1-2.
Samsung. "Specification of Requirements Regarding Setting of AS-Config." 3GPP TSG-RAN2#66 meeting, Agenda tern: 5.8.4, Tdoc R2-093030, 3rd Generation Partnership Project, San Francisco, CA, USA, May 4-8, 2009, pp. 1-8.
3rd Generation Partnership Project. "3rd Generation Partnership Project; Technical Specification Group Radio Access Network; Evolved Universal Terrestrial Radio Access Network (E-UTRAN); X2 application protocol (X2AP) (Release 8)." 3GPP TS 36.423, V8.5.0 (2009-03), Mar. 2009, pp. 1-100.

\* cited by examiner

HANDOVER IN A RADIO COMMUNICATION NETWORK

This application is a continuation of U.S. patent application Ser. No. 13/318560, filed 2 Nov. 2011, which is a national stage application of PCT/SE2009/050480, filed 4 May 2009, the disclosures of each of which are incorporated herein by reference in their entirety.

TECHNICAL FIELD

The present invention generally relates to the field of telecommunications. More specifically, the present invention relates to improved handover in a radio communications network.

BACKGROUND

The present invention finds application particularly in next generation networks as defined by 3GPP and which is commonly known as Long Term Evolution (LTE). However, the techniques may be applicable also in connection with other types of radio networks, such as WCDMA, GSM, CDMA etc. Thus, may for instance Radio Base Station (RBS) as used hereinafter refer to eNodeB (eNB) in LTE as well as NodeB (NB) in WCDMA or any other node handling a radio interface in a radio network.

The radio network equipment vendors choose in the product implementation, in cooperation with the operator, which Radio Link Control (RLC) Mode to use for a certain radio bearer with a certain Quality of Service Class Identifier (QCI). With the low round trip time in LTE, different RLC Modes may be suitable for real-time services. Therefore, it can be foreseen that some vendors select unacknowledged RLC for real-time services like Voice over Internet Protocol (VoIP), while others select acknowledged RLC.

According to the 3GPP standard reconfiguration of RLC Mode of data radio bearers (DRBs) is not supported in E-UTRAN, making the radio bearer being dropped during handover if there is a mismatch in RLC Mode between Source eNB and Target eNB for a certain radio bearer with a certain QCI.

SUMMARY

One object according to one aspect of the present invention is to at least alleviate problems mentioned above.

One object of one aspect according to the present invention is to provide a method and a network node that prevents radio bearers from being dropped if a mismatch in RLC Mode exists between source Node and target Node.

If a mismatch in RLC Mode is identified by Target eNB in an intra-LTE handover from a Source eNb, the preferred pre-configured RLC Configuration in Target eNB is overridden and an alternative RLC configuration with the same RLC Mode as in Source eNB is assigned.

These objects, amongst others, are achieved, according to one aspect of the present invention, by a method in a target radio network node supporting a handover from a source radio network node. The target network node comprises a table having preferred relations between a specific QCI and a specific RLC configuration.

The method comprises the steps of receiving, from the source radio network node, at least a Quality of Service information element including at least a QCI parameter, and a RLC Configuration information element including at least a RLC Mode parameter, checking if the received RLC Mode corresponds to the RLC Mode for the preferred RLC configuration in said first table for the received QCI, and if said check fails, mapping said received RLC configuration to an alternative RLC configuration having same RLC Mode as the received RLC Mode and being associated with a QCI corresponding to said received QCI.

One advantage according to one embodiment of the invention is that the RBS will not be sensitive to future decisions on relation between QCI and RLC Mode with respect to intra-LTE handover in multi-vendor RAN.

Another advantage according to one embodiment of the invention is that radio bearer re-establishment, e.g. causing unacceptable breaks in voice calls, will be avoided if different vendors realize radio bearers differently with respect to RLC Mode and QCI.

Another advantage according to one embodiment of the invention is that the RBS solution will be general, without need for specific solutions required by specific operators when other vendors make design choices.

Another advantage according to one embodiment of the invention is that the invention provides advantages in flexibility for proprietary, operator-defined, QCIs.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 3, which are given by way of illustration only, and thus are not limitative of the present invention.

DETAILED DESCRIPTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
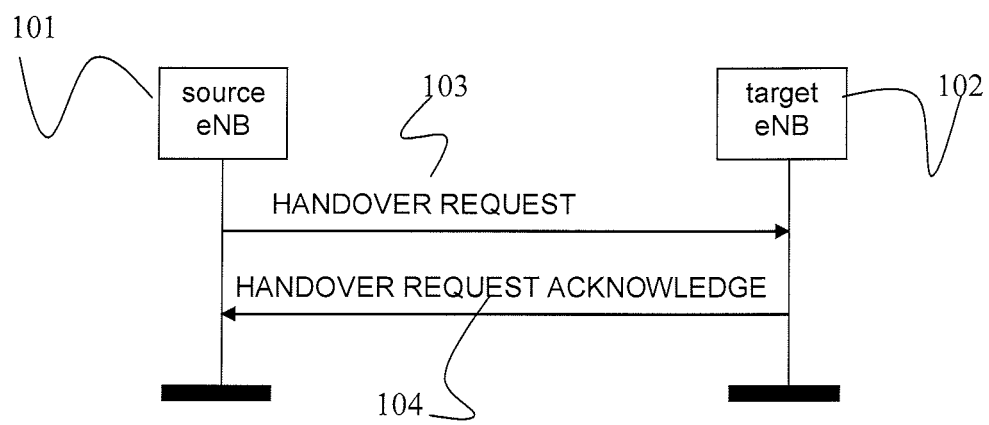
FIG. 1 is a signalling diagram showing signalling between a source and a target node for handover.

FIG. 1 is a signalling diagram showing the handover preparation between a source eNB 101 and a target eNB 102. The handover decision is taken by the Source eNB 101 based on measurement reports from the UE (not shown). The Source eNB 101 starts the handover process by sending a Handover Request message 103 to the Target eNB 102, which after making an admission control 104 acknowledges the handover request 105.

The Handover Request message 103 conveys the information needed by the Target eNB 102 to correctly set up the required radio bearers in the target cell. Such information include:

QCI, included in the System Architecture Evolution (SAE) E-RAB Level QoS Parameters information element (IE);

RLC Mode, included in the RLC-Configuration IE, which is a part of the AS-Configuration IE.

The bearer level Quality of Service (QoS) includes at least the following QoS parameters:

Quality of service class identifier, (QCI)
Guaranteed bit rate, (GBR)
Maximum bit rate, (MBR)
Allocation retention priority, (ARP)

When setting up a session, each service data flow is mapped to a QCI, which is a pointer, represented by a single integer number, pointing at an access node-specific, or eNB specific, configuration that controls the bearer level packet forwarding treatment, and that have been pre-configured by the operator of the eNodeB 101 and 102.

Each QCI, representing a service or service aggregate, is associated with a set of QCI Characteristics such as:
Resource type (i.e. GBR or non-GBR)
Priority
Packet Delay Budget, (PDB)
Packet Error Loss Rate, (PELR)

The QCI Characteristics are used to characterize the configurations of the eNB 101 and 102.

In 3GPP Release 8, nine different Standardized QCI Characteristics are being defined, used to ensure interoperability between operators. Besides these Standardized QCI Characteristics, the operator is free to define its own QCI Characteristics, mainly for operation within the operator's own network, since no interoperability is secured through the standard for these.

The most important parameter in the RLC protocol configuration is the RLC Mode. Three RLC modes are possible:

Transparent Mode, TM
Unacknowledged Mode, UM
Acknowledged Mode, AM

In RLC TM no overhead information is added, and therefore functions like segmentation and reordering are not possible.

In RLC UM functions like segmentation, concatenation and reordering are possible. Since this is an unacknowledged mode no retransmissions are possible, this mode is typically used for delay critical real-time services like voice and video.

In RLC AM retransmissions by an ARQ protocol is possible. This mode is therefore suitable to provide low packet error rates.

In an SAE/LTE network with eNBs from multiple vendors it is possible that certain QCIs are realized by different RLC Modes in different eNBs.

Thus, in the present embodiment, given only as an example, the source eNB 101 communicates, in the handover request message 103, a combination of QCI and RLC Mode not supported by target eNB 102.

According to the 3GPP standard reconfiguration of RLC Mode of DRBs is not supported in E-UTRAN. Therefore, at handover between eNBs 101 and 102, which are configured with different RLC Mode for the same QCI, the radio bearer should have been dropped. A re-establishment is possible, but will take time and give insufficient handover performance for real-time services.

Figure 2:
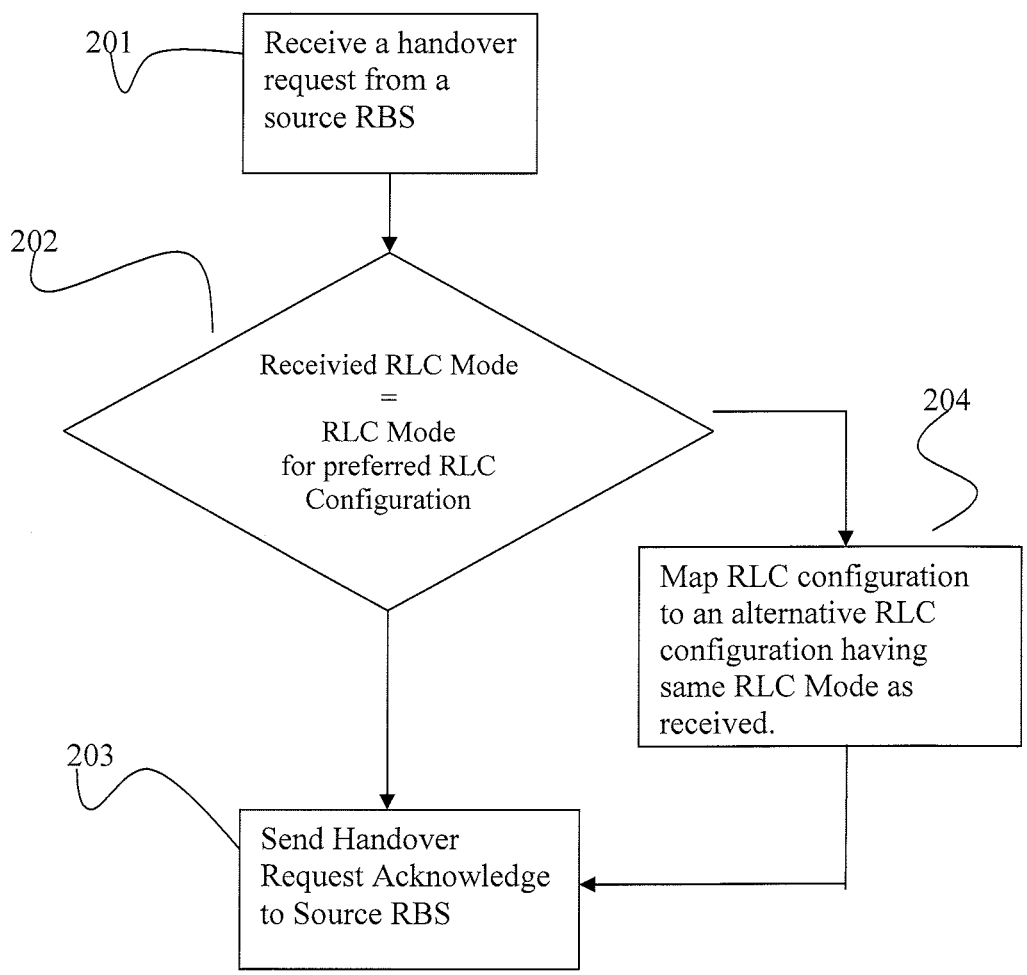
FIG. 2 is a flowchart showing the steps according to an embodiment of the present invention.

However, according to the invention and as is shown in FIG. 2, the target eNB 102 provides innovative means for handling the situation.

FIG. 2 is a flowchart showing the different steps according to one embodiment of the invention. In step 201 a handover request is received from the source eNB 101. A check is made in step 202 to verify if the RLC Mode as received in the handover request message 103 is equal to the RLC Mode for the preferred RLC configuration as defined in the target eNB 102 for the CQI received with the handover request message 103. If the RLC Modes are identical, and usual admission control (not shown) is positive, the handover request acknowledge message is sent 105 the source eNB 101 in step 203.

However, if there is a mismatch between the received RLC Mode and the RLC Mode for the preferred RLC configuration associated with the received QCI, the preferred RLC configuration is mapped to an alternative RLC configuration having the same RLC Mode as the received RLC Mode and associated with the received QCI, step 204. The handover request acknowledgement message 105 is sent to the source eNB 101 in step 203.

Figure 3:
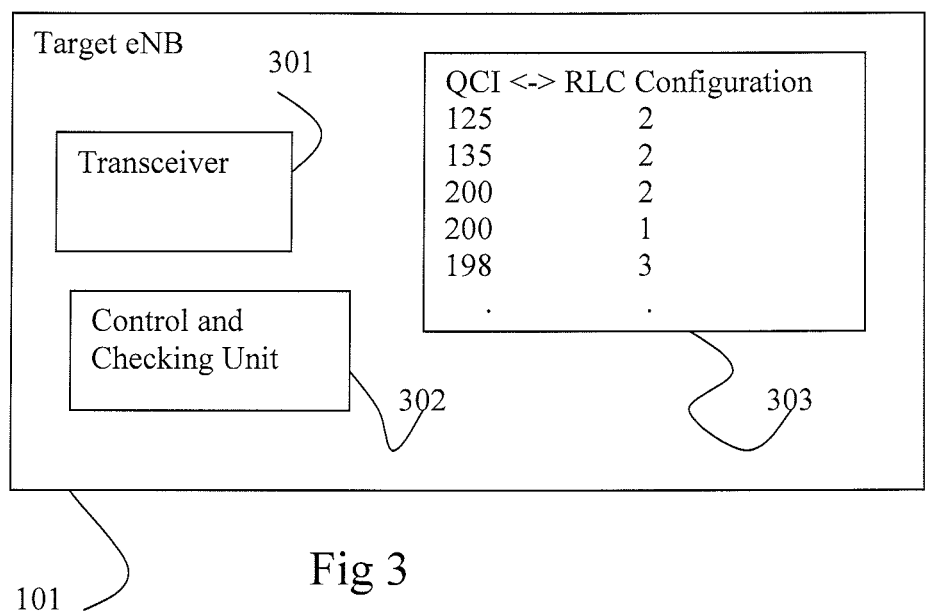
FIG. 3 is a schematic block diagram illustrating one embodiment according to the invention.

FIG. 3 is a schematic block diagram showing the target eNB 102 comprising a transceiver unit 301 for receiving and sending messages, such as the handover request message 101 and the handover request acknowledgement message 105. A control and checking unit 302 performs the check if the received RLC Mode is identical to the RLC Mode for the preferred RLC configuration and, if not, maps to an alternative RLC configuration as disclosed above in connection with FIG. 2.

The target eNB 101 also comprises a table 303 mapping QCI to RLC configuration. As stated before, each RLC configuration comprises an RLC Mode. Thus, the same QCI may be mapped to several RLC configurations of which one is the preferred RLC configuration.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method in a target radio network node supporting a handover from a source radio network node, said target radio network node comprises a table having preferred relations between a specific Quality of service Class Identifier (QCI) and a specific Radio Link Control (RLC) configuration at least comprising an RLC Mode, the method comprising:
   receiving, from the source radio network node, at least a Quality of Service (QoS) information element including at least a QCI, and an RLC Configuration information element including at least an RLC Mode;
   checking if the received RLC Mode corresponds to the RLC Mode for the preferred RLC configuration in said table for the received QCI; and
   if said check fails, mapping said preferred RLC configuration to an alternative RLC configuration having the same RLC Mode as the received RLC Mode and associated with said received QCI.

2. The method according to claim 1, wherein said target radio network node comprises a second table associating specific QCIs to alternative RLC Modes.

3. The method according to claim 1, wherein said target node comprises an eNode B in a Long Term Evolution (LTE) radio network.

4. A target radio network node comprising:
   a table having preferred relations between a specific Quality of service Class Identifier (QCI) and a specific Radio Link Control (RLC) configuration;
   a transceiver for receiving, from a source radio network node, at least a Quality of Service (QoS) information element including at least a QCI, and an RLC Configuration information element including at least an RLC Mode; and a control and checking unit configured to check if the received RLC Mode corresponds to the RLC Mode for the preferred RLC configuration in said table for the received QCI, and if said check fails, mapping said received RLC configuration to an alternative RLC configuration associated with said received QCI.

5. The target radio network node of claim 4, further comprising a second table associating specific QCIs to alternative RLC Modes.

6. The target radio network node of claim 4, wherein said target radio network node comprises an eNode B in a Long Term Evolution (LTE) network.

* * * * *